May 2, 1939.    A. O. LA DUCER    2,156,633
MULTIPLE OUTLET STRIP
Filed June 19, 1937
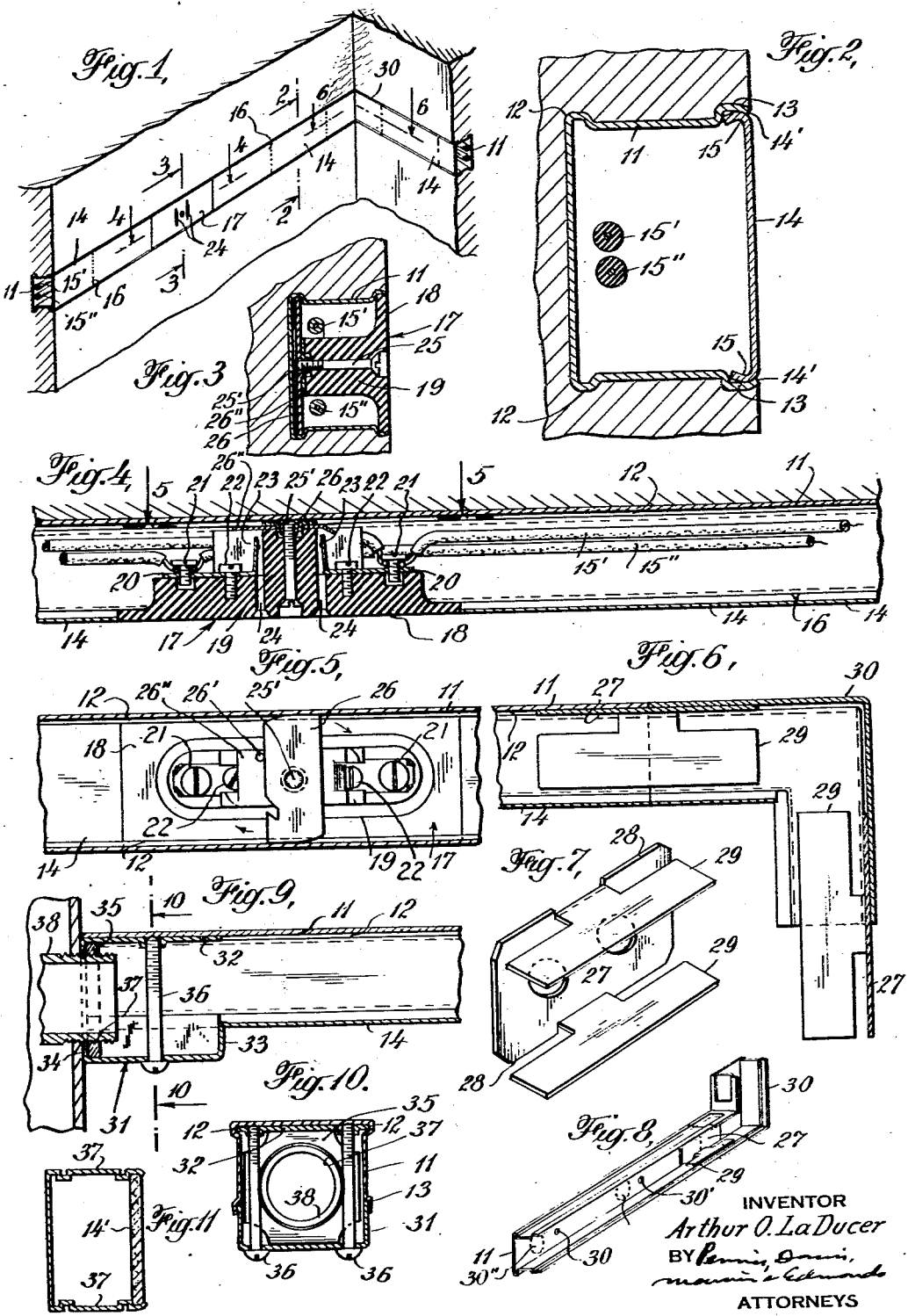
INVENTOR
Arthur O. LaDucer
BY
ATTORNEYS Patented May 2, 1939

2,156,633

UNITED STATES PATENT OFFICE 2,156,633

MULTIPLE OUTLET STRIP

Arthur O. La Ducer, West Hartford, Conn., assignor to The Wiremold Company, Hartford, Conn., a corporation of Connecticut Application June 19, 1937, Serial No. 149,073

7 Claims. (Cl. 174—48)

My invention relates to conduits for electric wiring systems, and includes means for providing a multiple outlet strip or conduit adapted to carry ordinary electrical wires, which strip may not only be mounted on the wall on which it is installed in accordance with the usual practice, but may also be imbedded in the wall, so as to bring the surface of the conduit flush with the surface of the wall, and which in either case makes it possible quickly and cheaply to supply electrical wiring devices at any time and in any place along the strip or conduit, in such manner as to bring the surface of the wiring devices (outlets for example) flush with the surface of the conduit.

In the drawings attached to this specification—

Figure 1 is a view of a wall to which my form of conduit has been imbedded;

Figure 2 is a large-scale cross section at 2—2 of Figure 1;

Figure 3 is a cross section at 3—3 of Figure 1, showing the construction of the outlet device;

Figure 4 is a longitudinal section on the line 4—4 of Figure 1;

Figure 5 is a section on the line 5—5 of Figure 4, viewed from the back;

Figure 6 is a section in plan on the line 6—6 of Figure 1; it shows, among other things, the connector which I use in fastening together adjacent sections of my conduit;

Figure 7 is a general view of the connector;

Figure 8 is a view of a portion of my conduit showing an elbow, in place, of the type known as the flat 90° elbow;

Figure 9 is a longitudinal section of my conduit showing my improved end fitting;

Figure 10 is a section on the line 10—10 of Figure 9, and

Figure 11 shows a modified construction.

The conduit 11 (Figures 1 and 2) is a channel member rolled out of thin metal, and as here shown is substantially rectangular in section, being provided with internal grooves 12, 12, and offsets 13, 13, Figure 2. A cover strip 14, which may be made of metal, fiber, Bakelite, or other proper material, snaps into the offsets or lips 13, which offsets at their external edges are bent in, as shown at 14', in order to securely hold the cover in place; the edges of the cover are rounded as shown at 15.

The internal grooves 12 constitute, on the outside of the conduit, external projections. These groove-projections have various functions; first, to lock the conduit in place when, as is often the case, it is imbedded in the plaster of the wall; second, to hold the outlet structure in place in the conduit as will be hereafter more fully described; third, to engage with the connector, the end fitting, etc., as more fully described below, and fourth, to broaden the base of the conduit, or increase the width of the footing thereof when the conduit is mounted exposed on the surface of a wall.

The wires 15', 15'', are laid in or threaded through the conduit in the usual way; Figures 1, 2 and 3.

The cover plate 14 is weakened at intervals as shown by dotted lines in Figure 1 at 16, 16, and in section in Figure 4. The arrangement shown is such that the outer surface of the cover plate is flush with the wall, presenting the appearance of an ornamental strip affording no projections to catch dust, take up room or detract from the appearance of the wall.

At any point where it is desired to insert a wiring device, as for example an outlet, a section of the cover plate 14 is broken away and removed; in its place is inserted the wiring device, here illustrated as an outlet member 17, shown in section in Figures 3 and 5. As shown the cover plate 18 is integral with the body 19 of the outlet member. The body 19 carries the terminal clips 20, 20, provided with the usual binding screws 21, 21, which clips are held in place on the body by the screws 22, 22, and are upset at the inner ends 23, 23, the upset ends being in proximity to the open ends or slots 24, 24, Figure 4, and so located as to make contact with the blades of an attaching plug.

A screw-headed bolt 25, Figure 3, runs vertically through the center of the block. For locking the receptacle in place in the conduit, I provide a locking mechanism consisting, in the form shown, of a cam-shaped piece attached to the receptacle, with means for causing a locking action; for this purpose a screw-headed bolt 25, Figure 3, runs vertically through the center of the block and passes through a threaded hole in the cam-shaped piece 26, Figures 3 and 4. The end 25' of the bolt is upset enough to prevent separation of the bolt from the cam-shaped piece, but not so as to prevent the screw from turning freely in the cam-shaped piece. A stop 26' is located as shown in Figure 5. A thin piece of fiber 26'' is inserted as shown in Figure 4 to prevent the wires from touching the cam-shaped piece.

Each of the wires 15', 15'', is stripped of its insulation for a short distance at the proper point and at that point is passed under one of the binding screws 21, 21, and there mechanically and electrically connected by tightening the binding screw. The wiring device is then slipped into place in the conduit, its surface 18 coming flush with the surface of the conduit cover 14. The screw 25 is then turned to the left to force the cam-shaped piece against stop 26', and further turned to jam the cam-shaped piece against the riveted end of the bolt. The screw is then turned to the right, forcing the cam-shaped piece into the recesses 12 at the bottom of the conduit, and further turned to the right to draw the cam-shaped piece solidly against the upper edges of the recesses, thereby the outlet member is rigidly held in place. The location of the recesses 12, 12, at the bottom of the conduit, adjacent to the back wall thereof, allows a firm and substantial locking action without disturbing the conduit.

The construction shown in Figure 11 differs from the construction heretofore discussed in the shape of the side wall of the conduit, the difference being in the offsets 37, 37, which increase the space available in the conduit and at the same time preserve the advantages above set forth. This figure also shows a form of cover 14' particularly adapted to be made of fiber, Bakelite or other material other than metal.

I am able in this manner to supply a conduit system which may be mounted in an exposed position on the wall or which may be entirely flush with the surface of the wall and by which it is possible to install a wiring device at any time at any desired place.

Adjacent lengths of my conduit are best connected together by the connection piece 27, shown separately in Figure 7, comprising a base member, and side members. The width of the base member is such as to allow its edges 28 to slip into the grooves 12, while the spacing of the side members 29 is such as to allow them to lie against the inner walls of the conduit.

Figures 1 and 6 also show an internal elbow 30 applied to my conduit. Figure 8 shows the application of a flat 90° elbow. It also shows screw holes 30', 30', stamped in the inner side of the conduit 11, whereby the conduit may be fastened to the surface of a wall when it is not desired to imbed it in the wall, as shown in Figure 2, as well as knock-outs 30", 30", which may be provided at suitable intervals along the length of the inner side of the conduit 11 in order to facilitate connection to any ordinary wiring system.

For connecting my conduit system to an ordinary junction box or some other point at which current-carrying wires may be introduced, I provide an end connection fitting 31, shown in place in longitudinal section in Figure 9 and in cross section in Figure 10. This fitting comprises bottom member 32 which slides into the grooves 12, a box-shaped upper member 33, and end piece 34 provided with a circular opening, a coupling member 35 and two screw-headed bolts 36, 36. As shown in Figure 9 the internal screw threads on the member 37 may be applied to a screw-threaded conduit pipe 38; when the coupling member is sufficiently screwed into place a section 11a of my conduit may be slipped into place in such a manner that the grooves 12 engage the bottom plate 32 of the end connection fitting, whereby the whole structure is permanently held in place.

I claim:

1. An electric conduit comprising a channel member of generally rectangular cross-section having side walls and a bottom wall, each of said side walls being provided with a relatively narrow internal groove running longitudinally of the conduit and disposed immediately adjacent the bottom wall of the channel, and a wiring device of a depth substantially equal to the depth of the channel adapted to be received and locked in place within the walls of the channel, said wiring device comprising a body portion of a width substantially less than the width of the channel, and means for locking the wiring device in the channel comprising a turnable cam member secured to the wiring device, said cam member being of a width less than the minimum internal width of the channel and of a length not less than the width of the channel between the grooves at the bottom thereof, said cam member being adapted to be turned, after insertion of the wiring device into the channel, to enter the grooves formed at the base of the channel and thereby to lock the wiring device in the channel.

2. An electric conduit comprising a channel member of generally rectangular cross-section having side walls and a bottom wall, each of said side walls being provided with a relatively narrow internal groove running longitudinally of the conduit and disposed immediately adjacent the bottom wall of the channel, with the bottom wall of the channel defining the lower side of each of said grooves, a lip formed at the upper edge of each side wall, and an electrical outlet for reception within the walls of the channel comprising a cover portion of a width approximately equal to the width of the channel between the lips and adapted to be received between said lips, a body portion substantially narrower than the channel, and a turnable cam member mounted adjacent the base of said body portion, said cam member being of a width approximately equal to the width of the body portion and of a length approximately equal to the maximum internal width of the channel measured across the grooves at the base thereof, said cam being adapted to be turned, after insertion of the outlet assembly into the channel, in such manner as to enter the grooves at the base of the channel and thereby to lock the outlet assembly in the channel.

3. A wiring device for use in a conduit of the type having longitudinal grooves formed in the side walls thereof, comprising a face portion, a body portion for reception within the channel affording a passage for electric conductors, terminal clips mounted on the body portion for attachment to wires, a turnable member extending through the face portion and the body portion and adapted to be turned from the face side of the device, and a locking member actuated by said turnable member at the lower end thereof and adapted when in one position to permit insertion of the device into the channel, and to be caused to protrude from the device on each side thereof, by operation of the turnable member after insertion of the device in the channel, to enter the grooves formed in the channel so as to lock the device in place in the channel.

4. An electric outlet assembly for use in a conduit having internal grooves formed in the side walls thereof, comprising a substantially rectangular face portion of a width substantially equal to the width of the conduit, a body portion substantially narrower than the conduit, slots of rectangular cross-section extending through said face portion and into said body portion for the reception of prongs of a plug, said slots being spaced apart on ine running lengthwise of said body portion, metallic clips mounted on the body portion and positioned in said slots for making contact with prongs of a plug, binding screws for attaching wires to said clips, a cam screw extending through the face and body portions of the outlet, and a cam secured to the lower end of said cam screw and comprising a thin, generally rectangular member of a width approximately equal to the width of the body portion and of a length approximately equal to the maximum internal width of the conduit measured across the grooves in the side walls thereof, said cam being adapted to be turned by said cam screw, after insertion of the outlet assembly into the conduit, to enter the grooves at the bottom of the conduit.

5. In an electrical wiring system, a conduit comprising a channel member of generally rectangular cross-section having side walls and a bottom wall, said channel being mounted on a building wall in such manner that the open face of the channel is substantially flush with a surface of the wall, said side walls being extended outwardly adjacent the bottom wall to form outward extensions and corresponding relatively narrow internal grooves running longitudinally of the channel immediately adjacent the bottom wall of the channel, with the bottom wall of the channel defining the lower side of each groove, and lips formed at the upper edges of the side walls of the channel, a wiring device mounted in the channel and comprising a face portion of a width substantially equal to the width of the channel between the lips and adapted to be received therebetween, a body portion substantially narrower than the channel to provide space for the passage of wires between the sides of the body portion and the side walls of the channel, and a turnable cam member secured to the wiring device, said cam member being of a width less than the minimum width of the channel and of a length approximately equal to the maximum internal width of the channel measured across the grooves at the bottom thereof, said cam being turned with the wiring device in place in the channel in such manner that the ends of the cam are received in the grooves of the channel to lock the wiring device in place without substantially interfering with the allowance of space for the passage of wires between the body portion of the wiring device and the side walls of the channel, and a cover member of a width approximately equal to the width of the channel between the lips thereof and received within the side walls between said lips.

6. An electric conduit comprising a channel member of generally rectangular cross-section having side walls and a bottom wall, each of said side walls being provided with a relatively narrow internal groove running longitudinally of the conduit and disposed adjacent the bottom wall of the channel, and a wiring device adapted to be received and locked in place within the walls of the channel, said wiring device comprising a body portion for reception between the walls of the channel, and means for locking the wiring device in the channel comprising a locking member secured to said device and adapted when in one position to allow the device to be inserted into the channel member, with means whereby said locking member may be caused to protrude from the device on each side thereof to engage the grooves formed in the channel so as to lock the device in place in the channel.

7. An electric conduit adapted to receive and firmly hold a wiring device having a locking member, the said conduit comprising a wire-receiving channel member having two side walls and a bottom wall, each of said side walls being bulged outwardly to provide a pair of narrow internal grooves running longitudinally of the channel adjacent the bottom wall thereof, with the bottom wall of the channel defining the lower side of each of said grooves, the grooves being adapted to receive the locking member of the wiring device with the locking member substantially flush with the bottom wall of the wire-receiving channel, whereby substantially the full depth of the channel is available for reception of the wiring device and the connecting wires, said outward bulging of the side walls serving also to provide external projections providing a plaster lock adapted to lock the conduit in the plaster of a wall, and lips formed at the upper edge of each side wall adapted to receive and hold flush with the face of the conduit a cover member having edge portions conforming to said lips.

ARTHUR O. LA DUCER.